April 18, 1939.　　K. C. HAWTHORNE ET AL　　2,154,678
DEAD-BEAT INCLINOMETER, ACCELERATION, AND DECELERATION METER
Filed March 19, 1935　　3 Sheets-Sheet 1

INVENTORS:
Kenneth C. Hawthorne
Arthur B. Campbell
BY
J.M. Campbell ATTORNEYS.

April 18, 1939. K. C. HAWTHORNE ET AL 2,154,678
DEAD-BEAT INCLINOMETER, ACCELERATION, AND DECELERATION METER
Filed March 19, 1935  3 Sheets-Sheet 2

Kenneth C. Hawthorne
Arthur B Campbell
INVENTORS

BY J M Campbell
ATTORNEYS.

April 18, 1939. K. C. HAWTHORNE ET AL 2,154,678
DEAD-BEAT INCLINOMETER, ACCELERATION, AND DECELERATION METER
Filed March 19, 1935   3 Sheets-Sheet 3

INVENTORS
Kenneth C. Hawthorne
Arthur B. Campbell
BY
J M Campbell
ATTORNEY

Patented Apr. 18, 1939

2,154,678

UNITED STATES PATENT OFFICE 2,154,678

DEAD-BEAT INCLINOMETER, ACCELERATION, AND DECELERATION METER

Kenneth C. Hawthorne and Arthur B. Campbell, Thomaston, Conn.

Application March 19, 1935, Serial No. 11,886

6 Claims. (Cl. 33—215)

Our invention relates to instruments for indicating true level or horizontal positions or variations from true level or horizontal positions, and to instruments for indicating acceleration and deceleration.

One object of our invention is to provide a device for indicating that its support is inclined either laterally or longitudinally or both on a single dial, and the amounts of these variations from a true level position.

Another object of our invention is to secure a device which is at all times positive and accurate in its action and yet simple in construction and operation.

Another object of our invention is to provide a device which is small and compact and which can be mounted on an instrument board or other support with its dial vertical and in the plane of the instrument board or support without requiring an appreciable depth.

Another object is to provide a simple and accurate means of indicating acceleration and deceleration on a suitable scale perpendicular to the line of motion of its support.

Another object of our invention is the production of a novel form of connection between an actuator (in the present instance a pendulum) and an indicator which is wholly free from mechanical connection, thereby avoiding the use of any mechanical gearing or other mechanisms between said two parts, thus eliminating friction and thereby improving accuracy.

Other objects of the invention will be more specifically pointed out and described hereinafter as described and set forth in the following specifications and accompanying drawings forming part of the same.

Figure 1:
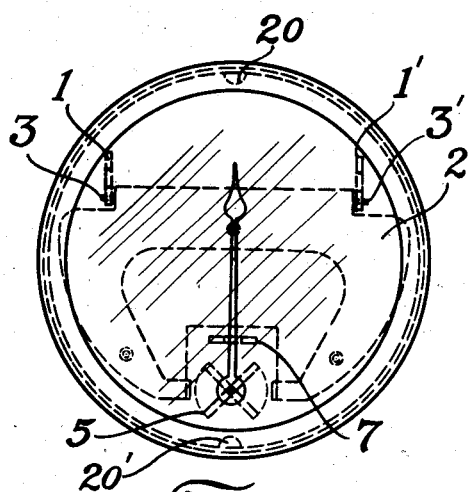
Figure 1 is a front elevation of one form of our device, without the dial.

As shown in the drawings which show one of the forms our invention may assume the device consists essentially of a pendulum in the form of a horseshoe magnet pivoted at the closed end so as to hang in a vertical position under the action of gravity or other means while the supporting frame is rotated around the pivots. An armature formed by twisting a rectangular iron piece so that its long edges form a helix around the axis carrying the indicating pointer in the supporting frame, is pivoted in relation to the poles of the magnet so that the flux from the magnet is carried between the poles through a radial section of the armature, the flux rotating the radial section until it assumes the position making the total air gap in the magnetic circuit a minimum. Thus for every position of the magnet poles along the axis of the armature is a corresponding position of the armature which indicates the exact position of the magnet with respect to the supporting frame. For some applications, with the armature hanging midway in its swing the indicating pointer is adjusted to read zero at center scale. Tilting the frame forward causes the pointer to rotate in one direction and tilting the frame backward causes opposite rotation of the pointer, the magnitude of movement depending on the pitch of the helix. For automobile application the scale is laid out to read directly in per cent grade.

Figure 8:
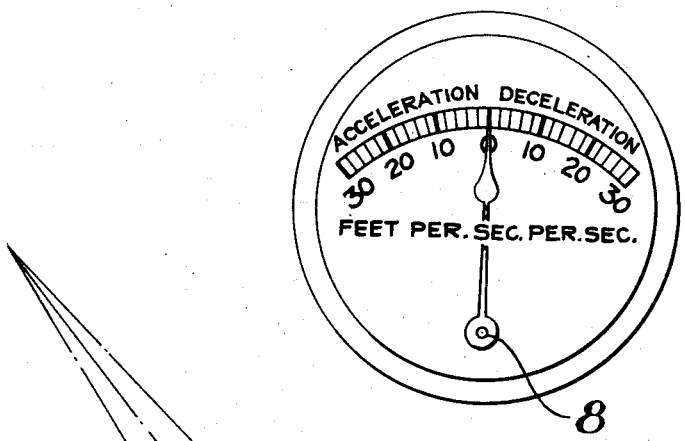
Figure 8 shows a view of the scales and pointer to indicate acceleration and deceleration.

On account of this application it has been necessary to design a device which will have the indicating unit in the plane of the instrument board while the pendulum, which is the actuating part, is restricted to motion in a plane 90° to the indicator so that it will respond to variations in grade of the road. By using the same means, but substituting a scale as shown in Fig. 8 the device becomes an acceleration and deceleration meter, since the pendulum responds to forces of acceleration and deceleration.

By using the means described to indicate angular motion of the frame, the angular motion of the pointer can be made many times the angular motion of the frame, for instance, in one model the armature has been formed to have its ends twisted 90 degrees to each other so that the pointer will rotate 90 degrees when the magnet pole tips are swung from one end of the armature to the other. It is seen that the angular multiplication thus depends on the pitch of the helix and the length of the actuating pendulum.

Referring more specifically to the drawings 1 and 1' show the pendulum supports which also serve as two of the plate spacers, 7 a similar part being a spacer only. The magnetized pendulum 2 carrying pivots 3 and 3' is supported in suitable pivot holes in spacers 1 and 1' so that it is free to swing between the plates 11 and 11' and will always assume a vertical position due to gravity. The helically shaped iron armature 5 carrying pivots 8 and 8' is supported in the movement plates 11 and 11' in suitable pivot holes and is free to rotate between the magnetic pole tips of pendulum 2, always assuming the position which will make the total air gap in the magnetic circuit a minimum. Pointer 6, fastened to armature pivot 8 indicates on the dial 10 the position of the armature 5. A suitable scale 13 is printed on dial 10.

Figure 2:
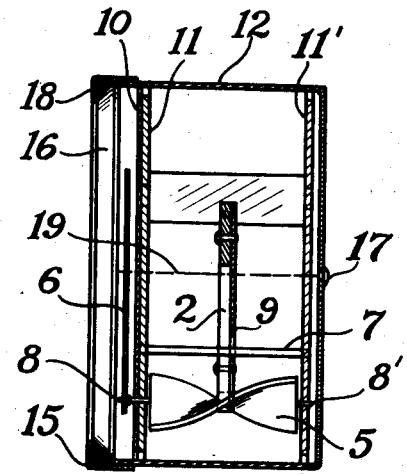
Figure 2 is a side elevation of the same with part of the casing removed.
Figure 4:
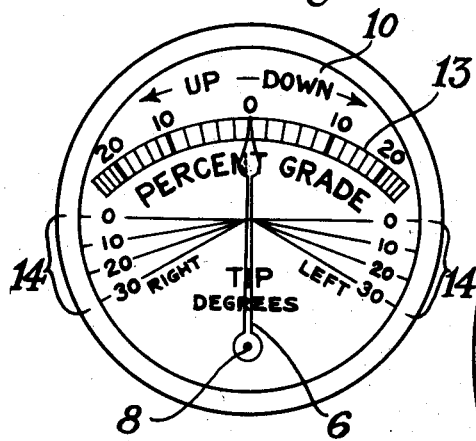
Figure 4 shows a view of the scales and pointer.
Figure 3:
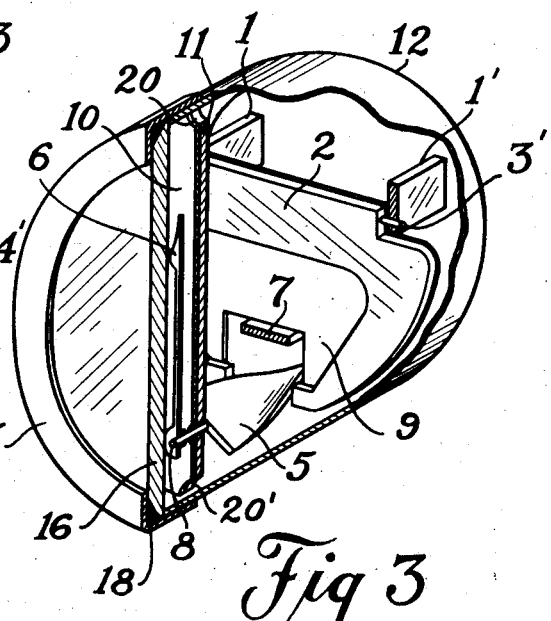
Figure 3 is a perspective view showing the arrangement and combination of parts.
Figure 5:
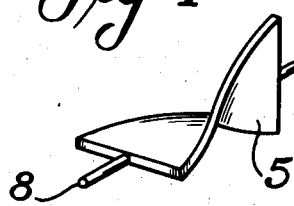
Figure 5 shows the armature in perspective.

The assembled movement is enclosed in a suitable casing 12 the glass front 16 being held in place by a tight fitting bezel 15. A suitable cement seal in space 18 renders the case air tight so that it may be partly filled with a suitable damping fluid. After the glass is sealed in place sufficient damping fluid is introduced through a hole in the case back to bring the level to the instrument center line 00, Figure 4. In Figure 2 this level is shown on line 19. The hole in the case back is then sealed by a tight fitting plug 17.

Notches 20 and 20' in dial 10 allow free movement of the damping fluid.

Satisfactory damping of the magnet pendulum is obtained by covering the space between the limbs with a sheet of non-magnetic material 9.

The fluid level 19 is also used for indicating the variation from level laterally when the pointer indicates zero on the incline dial and shows on the scale 14 and 14' as degrees tip right or left.

Figure 9:
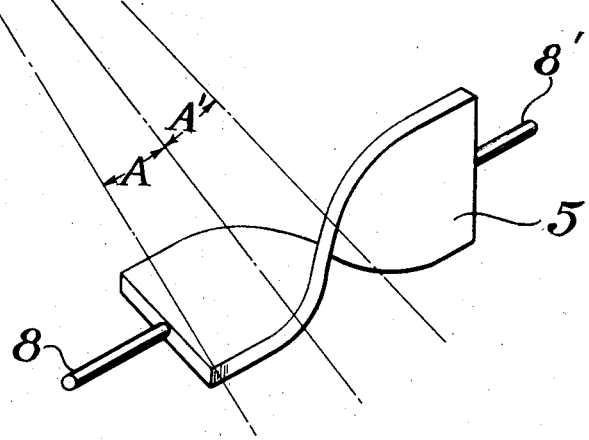
Fig. 9 shows an enlarged perspective view of the armature which clearly illustrates the shape required to obtain the type of scale distribution (expanded center and condensed ends) as illustrated in Fig. 4.

By using an armature as shown in Fig. 9 having a gentle slope at the ends and a steep slope in the center, it is seen that the pendulum moving through angle A over the gentle slope portion of the armature, causes the pointer to move over a comparatively short portion of the scale. A corresponding angular motion of the pendulum through angle A' over the steep slope portion of the armature causes the pointer to move over a long portion of the scale.

Figure 6:
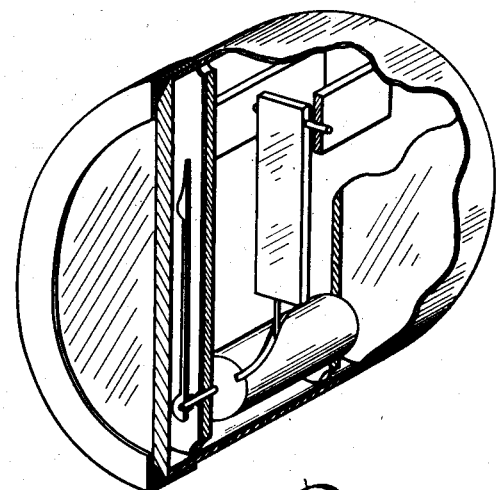
Figures 6 and 7 show in elementary form a mechanical adaptation of our device.
Figure 7:
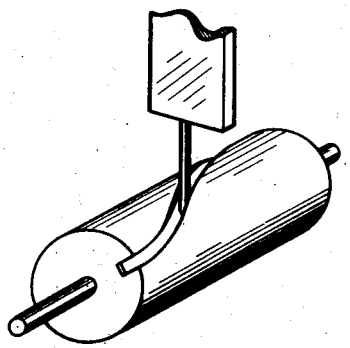

Another form our invention may assume is shown in elementary form in Figure 6 in which the magnet and armature are replaced by a pendulum and grooved cylinder mechanically connected.

The swinging of the magnet poles in a circular arc away from the axis of the armature is compensated for by special forming of the armature and by locating its axis so that the magnet poles are slightly below its axis in the mid-position and the same distance above its axis at the extremes of the swing.

In accordance with the provisions of the patent statutes, we have herein described the principle of operation of our invention. We desire to have it understood that the embodiment shown is only illustrative and that the invention may assume other forms. While it is designed to use the various elements in the combinations described some of these may be altered and others omitted without interfering with the more general results outlined and the invention extends to such use.

Having described our invention, what we claim and desire to secure by Letters Patent is:

1. An inclinometer comprising a magnetized pendulum mounted to swing freely under the influence of gravity, a flattened helical armature of approximately 90° maximum twist, magnetically connected to said pendulum and solely dependent on the displacement of the pendulum for position, means for indicating the relative position of pendulum and armature, the axis of the indicating means being substantially perpendicular to the plane of the pendulum in its mid-position and showing longitudinal variations in level of the instrument support, a suitable casing supporting the parts in operative position and serving as a means to maintain proper coordination of armature and pendulum.

2. An instrument comprising in combination a magnetized member, and a flattened helical armature of approximately 90° maximum twist, magnetically connected therewith and dependent solely on the displacement of the member for its position so that motion imparted to the member will be transmitted to the armature, means for indicating the relative position of member and armature, the axis of the indicating means being substantially perpendicular to the plane of the member in its mid-position, a suitable casing supporting the parts in operative position and serving as a means to maintain proper coordination of member and armature, and a damping fluid effective on any selected moving parts.

3. In an inclinometer means for obtaining a frictionless connection of high sensitivity comprising a magnetized pendulum, a flattened helical armature of approximately 90° maximum twist, magnetically connected therewith and solely dependent on displacement of the pendulum for its position, means for indicating the relative position of the pendulum and armature and a suitable casing supporting the parts in properly coordinated operative position.

4. An instrument comprising a movable magnetized inertia member free to respond to forces of acceleration and deceleration, a flattened helical armature of approximately 90° maximum twist, magnetically connected therewith, and dependent solely on the displacement of the member for its position, means for indicating the relative position of member and armature to show acceleration and deceleration of the instrument support, and a suitable casing supporting the parts in properly coordinated operative position.

5. An inclinometer comprising a magnetized pendulum mounted to swing freely under the influence of gravity, a flattened helical armature of approximately 90° maximum twist, magnetically connected to said pendulum and dependent solely on the displacement of the pendulum for position, means for indicating the relative position of pendulum and armature and a suitable casing supporting the parts in properly coordinated operative position and containing a damping fluid in which the surface of the damping fluid indicates lateral variations in level of its support on the same scale on which are shown longitudinal variations in level.

6. Means for obtaining any desired scale distribution in inclinometers and acceleration-deceleration meters comprising a swinging magnetized member, a flattened helical armature of approximately 90° maximum twist magnetically connected therewith and solely dependent on the displacement of the member for position, said armature having a pitch predetermined by the scale distribution desired, the parts being held in properly coordinated operative position by a suitable casing.

KENNETH C. HAWTHORNE.
ARTHUR B. CAMPBELL.